United States Patent Office 3,128,181
Patented Apr. 7, 1964

3,128,181
SHEET MATERIAL COATED WITH WATER-RE-
SISTANT POLYVINYL ALCOHOL AND METHOD
OF MAKING THE SAME
Towers Doggett, Westbrook, Maine, assignor to S. D.
Warren Company, Boston, Mass., a corporation of
Massachusetts
No Drawing. Filed Feb. 13, 1962, Ser. No. 172,874
5 Claims. (Cl. 96—33)

This invention relates to sheet material coated with polyvinyl alcohol composition and to processes for enhancing water-resistance in coating containing polyvinyl alcohol.

Polyvinyl compounds are ordinarily produced by polymerization of the corresponding vinyl monomers. Since the monomer vinyl alcohol is not known to exist, however, it obviously is not possible to produce polyvinyl alcohol by polymerization thereof. Instead polyvinyl alcohol is produced by hydrolysis of a polyvinyl ester, as by treating the same with an alkali or an acid in a suitable medium. Present commercial processes for producing polyvinyl alcohol involve the hydrolysis of polyvinyl acetate by means of alkali. Commercial polyvinyl alcohol products vary in the degree to which hydrolysis of polyvinyl acetate has been carried. Most grades sold as completely hydrolyzed polyvinyl alcohol have about 98% of the acetyl groups replaced by hydroxyls, but the newer and probably best grades have 99.7% or more of the acetyl groups replaced by hydroxyl groups.

Polyvinyl alcohol has been suggested for use in coating a wide variety of sheet materials, including coated lithographic printing plates made of paper or other flexible sheet material, as well as various other grades of coated paper. The present invention is useful in relation to any of such coatings containing polyvinyl alcohol. Its value is especially apparent, however, in the field of lithographic printing plates coated with polyvinyl alcohol compositions.

Coated plates or masters for offset or lithographic printing have come into wide use. Essentially such a plate comprises a supporting base, usually flexible, having an exposed surface comprising a layer of finely divided mineral matter in a matrix of insolubilized hydrophilic organic binding material. The mineral matter is usually clay, blanc fixe, or titanium dioxide, but occasionally zinc oxide or other pigments are included for special purposes. A considerable number of hydrophilic adhesives have been used as binding material with more or less satisfactory results.

Because of its many obvious desirable characteristics polyvinyl alcohol was among the materials first suggested for use as hydrophilic adhesive in coatings for lithographic plates. It was soon found, however, that polyvinyl alcohol in such coatings was too water-soluble to give satisfactory results. Attempts to render the polyvinyl alcohol water-insoluble by treatment with a curing agent such as bichromate or with a formaldehyde donor such as an amino-resin successfully improved the water-resistance of the polyvinyl alcohol coating, but at the same time markedly decreased the hydrophilic properties of the coating. That is to say, the resistance of the lithographic plate to scumming and toning is decreased when the polyvinyl alcohol is reacted with such material. To be sure, so-reacted polyvinyl alcohol is then satisfactorily water-resistant; but it has suffered so much in respect to its hydrophilic properties that except for special cases it has appeared to offer no marked superiority over other hydrophilic adhesives available for use in making coated lithographic printing plates. Consequently only a small proportion of the coated lithographic printing plates being sold at present are made with polyvinyl alcohol as the hydrophilic adhesive.

The present invention provides a method of rendering polyvinyl alcohol water-insoluble in situ in a layer of coating on a lithographic plate or other support, while at the same time retaining the original hydrophilic properties of the polyvinyl alcohol substantially undiminished. It thus provides a greatly improved lithographic plate having a water-insoluble polyvinyl alcohol coating thereon. It also provides a coated paper having a water-resistant coating comprising polyvinyl alcohol insolubilized without use of added insolubilizing agent.

In essence the process of the invention comprises applying to a paper web, or other suitable flexible base such as plastic or metal foil, a layer of aqueous coating composition consisting essentially of finely divided mineral pigment and polyvinyl alcohol adhesive and free from any added cross-linking agent to react with said adhesive. The coating is dried and the temperature is raised briefly until the surface temperature is over 175° C. and is preferably about 200° C. The high temperature apparently causes cross-linking either within the polyvinyl alcohol molecule or between adjacent molecules when incipient dehydration of the polyvinyl alcohol is attained. This action results in a film which is very water-resistant or water-insoluble, but leaves the so-insolubilized layer still retaining its original extreme hydrophilicity without appreciable diminution. At the same time the film retains the flexibility and strength which have always been characteristic of polyvinyl alcohol.

One product of the invention is a direct-image coated lithographic plate which will accept images typewriters, crayons, ball-point pens, and the like; will hold the images satisfactorily for long runs of printing; yet will keep clean in the unimaged areas throughout the life of the image.

Other perhaps even more valuable products of the invention lie in the field of presensitized coated lithographic plates. Such a presensitized plate in general comprises a suitable flexible base bearing on its surface a photosensitive layer such as a thin layer of a light-sensitive diazo compound. Presensitized plates are appreciably more expensive than usual direct-image plates, and criteria for excellence therein are more exacting than in the latter case. The surface of a pre-sensitized plate must be so water-insoluble that it will hold a half-tone image securely; it must be so hydrophilic that the background areas will remain clean and the areas between half-tone dots will not become filled; and it must be sufficiently flexible so that no cracks will develop to become filled with ink.

It is found that a thin layer of coating containing finely divided mineral matter, such as clay or titanium dioxide, and polyvinyl alcohol binder, but containing no "curing agent," can be rendered substantially water-insoluble by heat treatment of said coating layer by any desired means, as by exposure to radiant heat, high temperature gases, or the like until the surface temperature of said layer is above 175° C. for a period sufficient to cause some dehydration of the polyvinyl alcohol with subsequent cross-linking therein. At about 175° C. it may require a considerable period of time, say 10 to 30 minutes, to render the polyvinyl alcohol coating substantially water-insoluble. At a surface temperature of about 200° C., however, a few seconds may suffice to develop the desired degree of water-insolubility, especially where very pure (i.e., 99.7% hydrolyzed) polyvinyl alcohol is being used.

As a base or support for the polyvinyl alcohol lithographic coating there may be used paper, metal foil, or plastic foil such as cellulose acetate. While it is common practice to apply diazo sensitizers directly to metal or plastic foil which has had its surface slightly modified to permit the diazo compound to adhere thereto, it is very advantageous, as pointed out in my copending application Serial No. 107,657 (of which this application is a continuation-in-part) to interpose a layer of mineral-coating between the foil and the diazo sensitizer. While metal foil provides a base which is more dimensionally stable than paper and so is preferable for use in multi-color printing, for the vast majority of printing uses paper makes a very satisfactory base for plates, and obviously is much to be preferred from consideration of cost. It is desirable to have the base as flat as possible. For this reason it is desirable to coat the paper base with a mineral coating such as clay and casein. Advantageously the coating may be provided with a cast surface or it may be of a composition which is especially malleable in the presence of heat and/or moisture.

In the case of a paper base it is preferable that the paper be coated on the reverse or under side as well as on the top or printing surface. Such a coating on the reverse side acts to offset a tendency towards curl engendered by the coating on the active side. Moreover the back coating is also useful in the case of paper sized with rosin in that it minimizes the danger of rosin being transferred from the back of the sheet to the surface of the sheet upon which it may be superposed when packaged. The exact composition of the coating on the reverse side of the web is of little consequence. It may well be a commercial clay coating bound by starch or casein. Preferably the coating should be sufficiently water-resistant so that it will not stick to the plate cylinder on the lithographic press if inadvertently it becomes wetted.

To assure that a coated paper lithographic printing plate will give 15,000 or more satisfactory prints it is advantageous to provide a substantially water-impermeable barrier layer between the paper base and the lithographic printing surface. Such a barrier layer or coat can be provided by coating the paper web with a waterproof resinous polymer, which, if desired, can have a reasonable proportion of pigmenting material dispersed therethrough.

One satisfactory barrier coat is a layer of about 4 grams per square meter of a copolymer of about 86 parts vinyl chloride, 13 parts of vinyl acetate, and 1 part of maleic acid, said copolymer being deposited from solution in methyl isobutyl ketone. This not only makes a satisfactory barrier coat on paper, but it also makes a good anchoring layer to bind a polyvinyl alcohol coating to metal or plastic foils. A resin in this class which is satisfactory for use is sold by Union Carbide Corporation as "Vinylite Resin VMCH."

A second type of satisfactory barrier coat can be provided by a layer of acrylic resin, hardened if so desired by some harder resin, together with a lesser quantity of pigmentary matter. A layer of from 10 to 12 grams per square meter of about equal parts of polyethylacrylate, polystyrene, and clay deposited from aqueous medium, makes a satisfactory barrier coat. Considerable variations in the composition of the barrier coat are permissible. One satisfactory coating of this general nature was 11 grams per square meter, dry weight, of the following composition:

| | Parts by weight |
|---|---|
| Rhoplex HA–12, 45% solids emulsion | 160 |
| Polystyrene X–3304, 41% solids emulsion | 80 |
| Clay slip, 50% solids | 80 |
| Sulfonated tallow, 30% solids | 2.5 |
| Ammonia water, 28% ammonia | 1.5 |
| Water to make solids content about 30%. | |

Rhoplex HA–12 is a latex of emulsion-polymerized resin sold by Rohm & Haas Company. In a barrier coat it is substantially equivalent to polyethylacrylate.

Polystyrene X–3304 is a polystyrene latex sold by Dow Chemical Company.

Another barrier coat which has been used satisfactorily is a layer of about 4 grams per square meter of a copolymer of vinyl acetate with a small quantity, say 5%, of crotonic acid. Such a resin may be applied from solution in an organic solvent or in water containing ammonia or volatile amine. The resin solution may, if desired, also contain clay or other mineral pigment or filler dispersed therein. A resin of this type is sold as "Lemac 541" by The Borden Company.

A preferred hydrophilic coating for use on presensitized planographic plates is from 9 to 12 grams per square meter dry weight of the following composition in parts by weight:

| | |
|---|---|
| Titanium dioxide | 100 |
| Polyvinyl alcohol at least 99.7% hydrolyzed | 40 |
| Tergitol 4 (wetting agent) | 3 |
| Tributyl phosphate (anti-foam agent) | 1.5 |
| Water to make solids content 21%. | |

Tergitol 4 is the sodium sulfate derivative of 7-ethyl-2-methyl-undecanol-4 sold by Union Carbide Corporation.

This coating composition may be applied in a single application or by successive applications if desired. An air-knife coater is very satisfactory for applying this coating or other coating compositions mentioned herein.

After the hydrophilic coating has been dried it should be heated above 175° C. to "cure" the coating; that is, to insolubilize the polyvinyl alcohol. This was accomplished in a typical instance by passing the coated paper at 100 feet per minute through a 14 foot oven through which air at 370° C. was circulated. The surface of the coating upon emerging from the oven was at a temperature of 200° C. The coating so treated was found to be substantially water-insoluble. Thus it is seen that less than 10 seconds at 200° C. was adequate to insolubilize the polyvinyl alcohol.

A polyvinyl alcohol at least 99.7% hydrolyzed is available as "Vinol 125" sold by Union Carbide Corporation of New York, New York, and is very satisfactory for use according to the invention. There are also available on the market a considerable number of polyvinyl alcohol products which are at least 98% hydrolyzed. Some of these also are very satisfactory for use according to the invention. Other polyvinyl alcohol products of the latter class are somewhat less desirable for use because they require a higher temperature or a longer period of heating to attain the desired degree of insolubility. Thus, although such products can be rendered insoluble by sufficient heat, they are somewhat less satisfactory for use on paper bases because of the known undesirability of heating paper at high temperatures.

Two 98% hydrolyzed polyvinyl alcohol products which have been found satisfactory for use according to the invention are Du Pont's "Elvanol 71–30" and Shawinigan's "Gelvatol 1–90."

The so-coated and calendered sheet can be photosensitized by application of a thin wash-coat of known diazo sensitizers in solution. These sensitizers may be either negative-working sensitizers to be exposed through a negative transparency or positive-working sensitizers to be exposed through a positive transparency.

For negative-working plates it is known that satisfactory sensitization can be obtained by treatment with an aqueous solution of the zinc chloride double salt of the equi-molar condensation product of diazotized para-aminodiphenylamine with formaldehyde, or with an aqueous solution of the sulfonate of that product. Another satisfactory negative-working sensitizer is made by condensing 4-diazodiphenylamine hydrogen sulfate and paraformaldehyde in concentrated phosphoric acid. As little as 0.15 gram of this sensitizer per square meter of surface sensitized, is adequate. More can be used if desired, of course. When the sensitized sheet is exposed to actinic radiation through a negative transparency the exposed areas become water-insoluble and somewhat oleophilic, while the unreacted sensitizer on the unexposed areas remains water-soluble and is washed off before the plate is used.

A known sensitizer for positive-working plates is 6-benzoyl-3-(1,2 - naphthoquinone-2 - diazide-5-sulfonyl) pyrogallol. This sensitizer may be applied from solution in methyl isobutyl ketone in amount equivalent to about 0.25 gram dry weight per square meter of surface sensitized. To harden the image and make it more resistant to wear during the printing operation it is desirable to include with the sensitizer in the ketone solution a compatible resinous material, such as, for example, a cresol-formaldehyde condensate. If desired such a resin may be used in quantity 2 or 3 times as great as that of the sensitizer itself. When such a sensitized plate is exposed to actinic radiation through a positive transparency the exposed areas become sufficiently hydrophilic so that the exposed sensitized layer thereon can be washed off with aqueous alkaline solution such as a 5% solution of trisodium phosphate in water. The unexposed image area remains oleophilic and is not removed by the alkaline wash.

The sensitized web material so produced is cut into sheets and covered by a light-proof and moisture-proof wrapper. In such condition the sensitized paper can be stored for a considerable period of time without objectionable deterioration. The user merely needs to remove a sheet from the package, expose it to actinic radiation, such as an arc light, and then wash away the material on the unimaged areas. The plate is then ready to be used in lithographic printing.

While various barrier coats and sensitizing materials of the types described are known per se in the art, the polyvinyl alcohol hydrophilic planographic coats insolubilized by heat according to the present invention are unusually compatible therewith and produce plates markedly superior in clean running characteristics over those previously known.

Having thus described preferred embodiments of my invention, what I claim as new and desire to secure by Letters Patent of the United States is:

1. A process for preparing a lithographic printing plate comprising applying to a flexible base a thin coating of an aqueous dispersion of an at least 98% hydrolyzed polyvinyl alcohol containing finely-divided, mineral pigment and free from any added cross-linking agent, drying said thin coating, and heating the dried coating to a temperature above 175° C. for a sufficient length of time to render said thin coating water insoluble.

2. The process of claim 1 wherein said flexible base is a paper sheet that has been first coated with a barrier coating of a pigmented waterproof resinous polymer.

3. The process of claim 2 wherein said lithographic printing plate is rendered photosensitive by applying a wash coating thereto containing a sensitizer.

4. A product produced by the process of claim 1.

5. A product produced by the process of claim 3.

References Cited in the file of this patent
UNITED STATES PATENTS

| | | |
|---|---|---|
| 2,280,986 | Toland et al. | Apr. 28, 1942 |
| 2,413,789 | Scheiderbauer | Jan. 7, 1947 |
| 2,550,326 | Brown | Apr. 24, 1951 |
| 2,808,778 | Newman et al. | Oct. 8, 1957 |